Figures 1, 2, 3, 4:
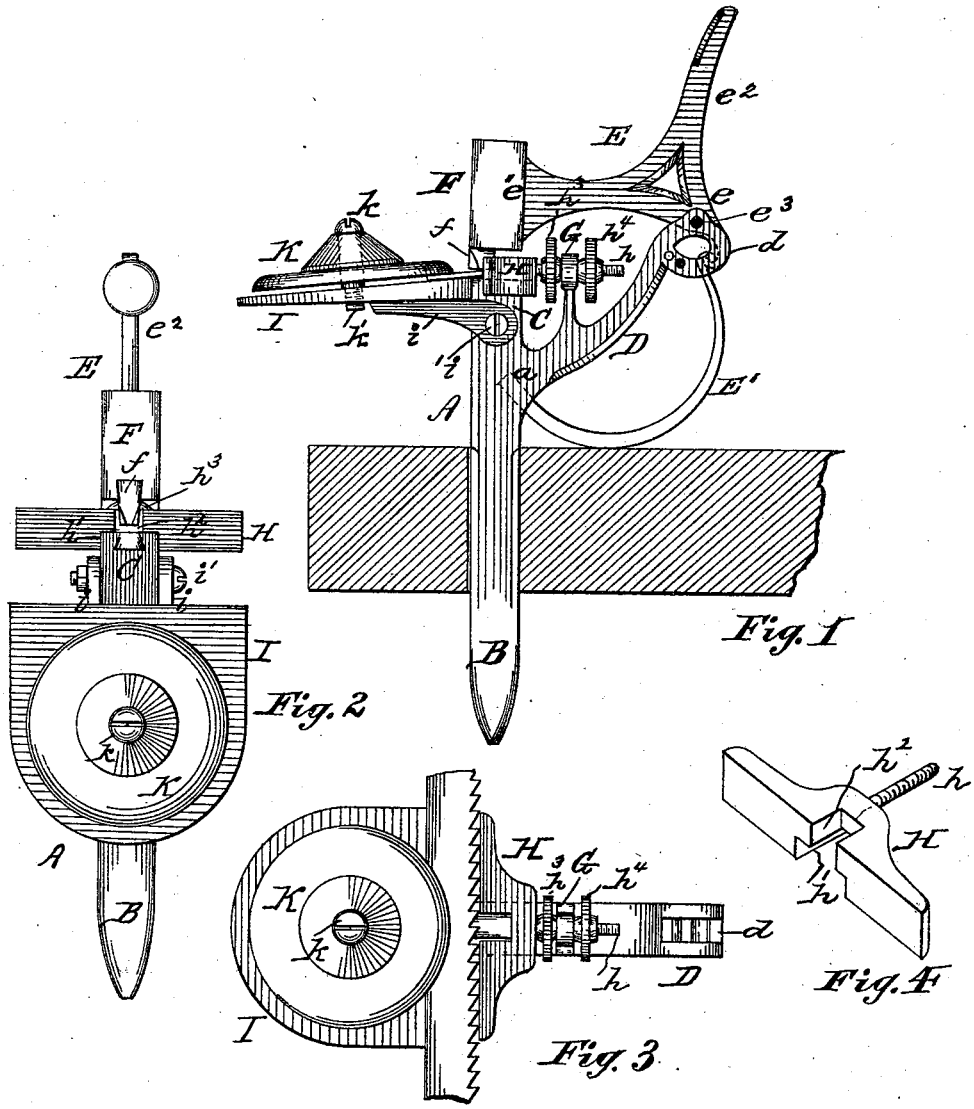

(No Model.)

J. M. DRAPER.
SAW SET.

No. 254,467.  Patented Mar. 7, 1882.

WITNESSES:
S. J. VanStavoren
Jos. B. Connolly

INVENTOR,
John M. Draper,
By Connolly Bros,
ATTORNEYS

UNITED STATES PATENT OFFICE.

JOHN M. DRAPER, OF PHILADELPHIA, PENNSYLVANIA.

SAW-SET.

SPECIFICATION forming part of Letters Patent No. 254,467, dated March 7, 1882.

Application filed July 15, 1881. (No model.)

*To all whom it may concern:*

Be it known that I, JOHN M. DRAPER, a citizen of the United States, residing at Philadelphia, in the county of Philadelphia and State of Pennsylvania, have invented certain new and useful Improvements in Saw-Sets; and I do hereby declare the following to be a full, clear, and exact description of the invention, reference being had to the accompanying drawings, which form part of this specification, in which—

Figure 1 is a side elevation of my invention. Fig. 2 is a front elevation of the same. Fig. 3 is a plan, and Fig. 4 is a detail perspective.

My invention has relation to that class of saw-sets in which the setting of the saw-teeth is effected by the striking action of a die; and my improvements consist in the peculiar construction and combination of parts hereinafter set forth and specifically claimed.

Referring to the accompanying drawings, A represents the stock of the implement, the lower portion of which is in the form of a tapered plug, B, adapted and designed to be inserted in a suitable hole in a bench, table, or other support. The upper end of the stock A, vertically in line with the plug B, constitutes the anvil or rest C, on which the saw-teeth lie while being set.

D represents a curved arm, integral with the stock A and projecting rearwardly therefrom. Its upper end is bifurcated, as shown at $d$, and affords a bearing for a three-armed lever, E. One of the arms, $e$, of this lever is pivoted at $e^3$ in the fork $d$. Another arm, $e'$, carries a die-head, F, and the third arm, $e^2$, serves as a handle for rocking the lever on its pivotal bearing or fulcrum, and thereby raising the die-head F, and with the latter the die $f$, held therein.

E' represents a spring, one end of which is fastened in the stock A, as shown at $a$, the other end engaging with the lever E, as shown. The tendency of this spring is to throw the lever E forward, and thus to communicate a quick stroke to the die when the handle $e^2$ is suddenly released.

G is an upright on the arm D, affording a bearing for a screw, $h$, which projects rearwardly from a gage, H, and is provided with adjusting-nuts $h^3$ $h^4$. Said gage is grooved on its under side, as shown at $h'$, to fit it to the anvil C, and has a vertical notch, $h^2$, for the passage of the die $f$.

I represents a platform, having two projecting arms, $i$ $i$, which embrace two sides of the stock A. A set-screw, $i'$, passing through said arms and stock, supports the platform I on said stock and permits its adjustment at various inclinations with respect to the latter and to the plane of the anvil C.

K is a disk, secured by a screw, $k$, to the platform I. Said screw $k$ has its lower end threaded, as shown at $k'$, the portion of its shank above the thread being smooth to allow the disk to move freely thereon. Said disk, with the platform beneath, forms a clamp for holding the saw while being set, as shown plainly in Figs. 1 and 3.

The operation is as follows: The saw to be set is placed between the platform I and the disk K and clamped therein by turning down the screw $k$. The platform I is adjusted to a proper inclination, according to the set desired for the saw-teeth, and the gage H also adjusted according to the length of such teeth. In setting a tooth the die is raised by moving back the handle $e^2$ and then suddenly releasing it, thus producing a quick stroke of said die under the influence of the spring E'. When one tooth has been set the saw is moved lengthwise to bring another into position, the disk K turning without loosing its clamping action, and thus permitting such lengthwise movement of the saw while holding the latter still clamped.

Where a saw too wide to pass between the screw $k$ and gage H requires to be set, said screw and the disk K may be wholly removed.

What I claim as my invention is as follows:

1. In combination with stock A, having projecting arm D, the three-armed lever E, one arm of said lever being pivoted and the other two arms respectively forming a handle and carrying a die-head, substantially as shown and described.

2. In combination with the stock A, having arm D, the pivoted three-armed lever E, the curved spring E' operating to move said lever forwardly and downwardly, as shown and described.

3. In a saw-set, a clamp composed of a platform, I, and a disk, K, secured thereto by a screw, k, said disk being extended over the platform I and free to rotate on the screw k, substantially as shown and described.

4. The combination of stock A, arm D, three-armed lever E, spring E', gage H, platform I, disk K, and screw k, substantially as shown and described.

In testimony that I claim the foregoing I have hereunto set my hand this 13th day of July, 1881.

JOHN M. DRAPER.

Witnesses:
E. D. McLOUGHLIN,
S. J. VAN STAVOREN.